(12) United States Patent
Somers

(10) Patent No.: US 7,684,547 B2
(45) Date of Patent: Mar. 23, 2010

(54) WIRETAPPING VOIP CALLS

(75) Inventor: Willard C. Somers, Rumson, NJ (US)

(73) Assignee: International Business Machines Corporation, Armonk, NY (US)

( * ) Notice: Subject to any disclaimer, the term of this patent is extended or adjusted under 35 U.S.C. 154(b) by 1081 days.

(21) Appl. No.: 11/349,409

(22) Filed: Feb. 7, 2006

(65) Prior Publication Data

US 2007/0183403 A1 Aug. 9, 2007

(51) Int. Cl.
*H04M 11/00* (2006.01)
*H04L 12/66* (2006.01)

(52) U.S. Cl. .................... 379/35; 379/90.01; 379/32.03

(58) Field of Classification Search .................... 379/35, 379/32.01, 32.03, 32.04, 45, 90.01, 93.05, 379/221.08, 221.09; 370/352, 229
See application file for complete search history.

(56) References Cited

U.S. PATENT DOCUMENTS 7,055,174 B1 * 5/2006 Cope et al. .................... 726/22

| 2004/0022237 | A1 * | 2/2004 | Elliott et al. ................. 370/356 |
| 2004/0143453 | A1 | 7/2004 | Weaver |
| 2004/0218731 | A1 | 11/2004 | Karimi-Cherkandi et al. |
| 2004/0240439 | A1 | 12/2004 | Castleberry et al. |
| 2005/0094651 | A1 | 5/2005 | Lutz et al. |
| 2005/0094773 | A1 | 5/2005 | Peterson |

* cited by examiner

*Primary Examiner*—Melur Ramakrishnaiah
(74) *Attorney, Agent, or Firm*—Dillon & Yudell LLP

(57) ABSTRACT

A method, system and computer program for assisting law enforcement surveillance of a telephone call in accordance with the requirements of is presented. The method includes, but is not limited to, the steps of: receiving an indication of a call that is placed with a pre-identified telephonic unit that uses an internet packet protocol for transmission, wherein the pre-identified telephonic unit has been selected for telephone call surveillance; converting the call into a converted call that is in analog form; and redirecting the converted call to an analog switching station that is capable of performing surveillance of the call.

17 Claims, 15 Drawing Sheets

WIRETAPPING VOIP CALLS

BACKGROUND OF THE INVENTION

1. Technical Field

The present invention relates in general to the field of computers and similar technology systems, and in particular to software utilized by such systems to implement methods and processes. Still more particularly, the present invention relates to the field of wiretapping Voice Over Internet Protocol (VoIP) telephone calls.

2. Description of the Related Art

On Oct. 25, 1994, the United States Congress enacted the Communications Assistance for Law Enforcement Act (CALEA). The essence of CALEA is that telecommunications carriers are required to have telecommunication systems that are capable of being used by law enforcement agencies to conduct electronic surveillance (wiretap) of calls made using the carriers' equipment. These requirements include making the telecommunications carriers update their wiretapping capabilities in response to new telecommunications technologies.

To amplify, or at least clarify, the requirement that telecommunication carriers keep their systems "wiretap-friendly," in Sep. 23, 2005 the United States Federal Communications Commission issued ET Docket No. 04-295, "In the Matter of Communications Assistance for Law Enforcement Act and Broadband Access and Services." This document states, inter alia, that CALEA applies to VoIP calls.

VoIP is an Internet Protocol (IP) based system that allows calls (which are primarily digitized voice information, but may include graphics as well as alpha-numeric written data) to be packeted into IP packets, and transmitted over the Internet to another VoIP unit. Typically VoIP units are voice telephones, but they may be any telecommunication unit, including computers, Personal Digital Assistants (PDAs), etc. Basically described, VoIP converts an analog voice signal into a digital format, packages the digital-formatted voice signal into an IP packet, sends the IP packet to an interface controller, which uses a look-up table to know where (i.e., which receiving phone) the IP packet is to be sent, and who (i.e., which sending VoIP phone) sent the packet.

Because of the enormous volume of IP traffic across the Internet, monitoring all IP packets, including VoIP packets, using traditional sniffer programs to locate and make copies of such VoIP packets is highly impractical, slow and expensive, if not technically impossible. Thus, telecommunications carriers presently have no acceptable way to be in compliance with CALEA.

SUMMARY OF THE INVENTION

Recognizing the problems presented to telecommunications carriers to monitor and record VoIP calls in accordance with the requirements of CALEA, a method, system and computer program for assisting law enforcement surveillance of VoIP calls is presented. The method includes, but is not limited to, the steps of: receiving an indication of a call that is placed with a pre-identified telephonic unit that uses an internet packet protocol for transmission, wherein the pre-identified telephonic unit has been selected for telephone call surveillance; converting the call into a converted call that is in analog form; and redirecting the converted call to an analog switching station that is capable of performing surveillance of the call.

In one embodiment of the invention, the pre-identified telephonic unit is a subject of a wiretap court order, and the surveillance of the call includes recording the call, which may be an audio-only call. Telephonic traffic outbound from the pre-identified telephonic unit may be via a Signaling System Number 7 (SS7) compliant switch, and the method may further include the step of sending to the SS7 compliant switch an override message that instructs the SS7 compliant switch to redirect the call in analog form to the analog switching station, wherein the override message is an Application Program Interface (API) that is transmitted to the SS7 compliant switch from an external application server.

The above, as well as additional purposes, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, where:

DETAILED DESCRIPTION OF THE PREFERRED EMBODIMENT

Figure 1A:
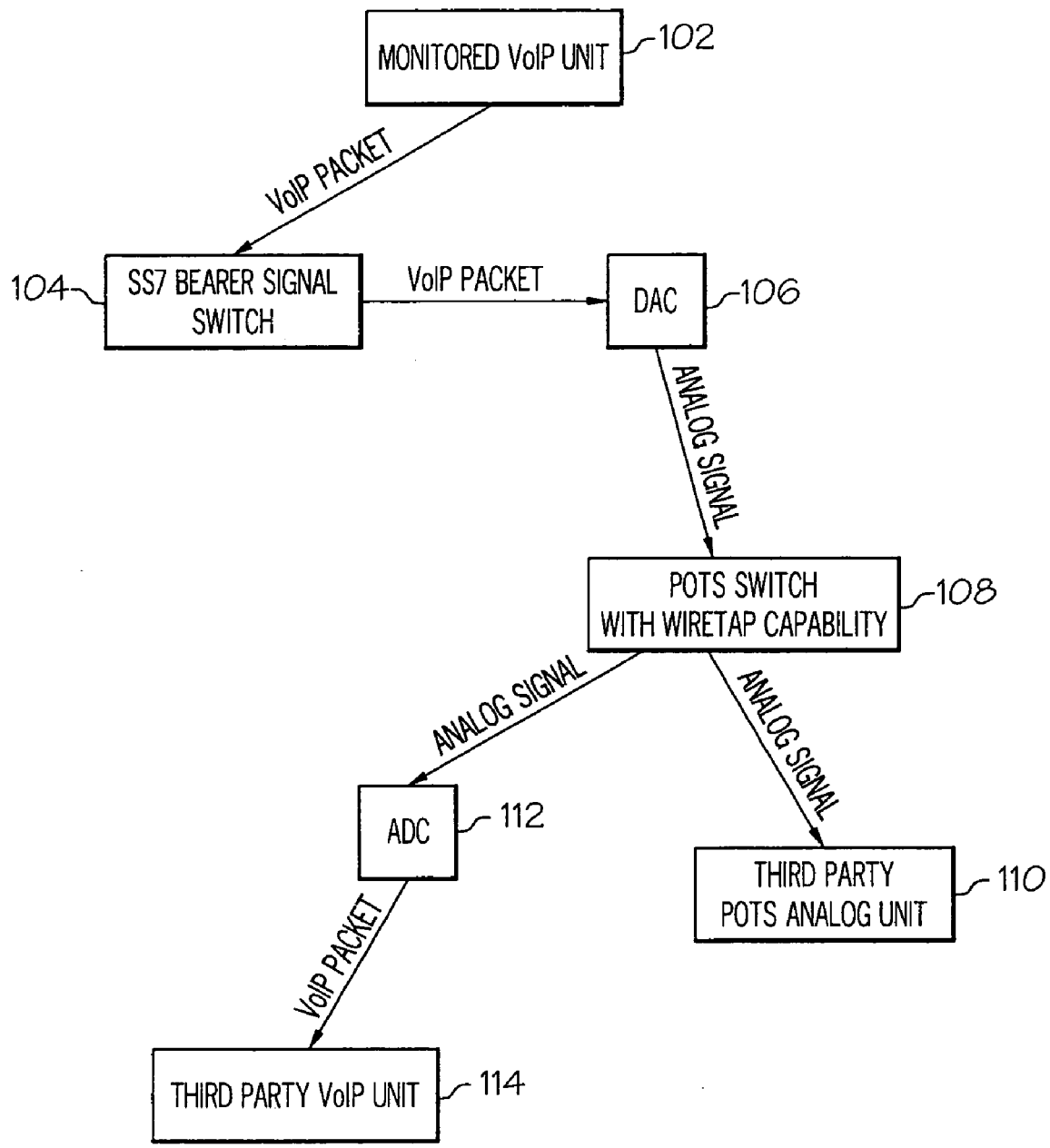
FIG. 1a depicts a routing flow of outgoing telephone calls from a VoIP telephone that is the subject of a court-ordered wiretap.

With reference now to the figures, and in particular to FIG. 1a, a routing flow of outgoing Internet Protocol (IP) packet calls that are to be wiretapped in accordance with the method and system described herein is depicted. A monitored Voice Over Internet Protocol (VoIP) unit 102 (e.g., telephone, Personal Digital Assistant—PDA, computer, etc.) sends a VoIP packet (e.g., containing a header and voice-data) is sent to a bearer signal switch 104, which is preferably compliant with Signaling System No. 7 (SS7), as defined by International Telegraph and Telephone Consultative Committee (CCITT), and incorporated by reference herein in its entirety. Bearer signal switch 104 sends the VoIP packet to a Digital-to-Analog Converter (DAC) 106, which converts the VoIP packet into an analog signal that is transmittable across a standard Public Switched Telephone Network (PSTN), including an analog-switched Plain Old Telephone System (POTS). The analog signal is then directed to a POTS switch 108, which has associated with it the technology required to perform a wiretap (with listening and recording capability) of calls that are routed through POTS switch 108.

In one embodiment, bearer signal switch 104 is directed to send the VoIP packet (and its analog signal descendent) to POTS switch 108 by an Application Program Interface (API) overhead program, such as a Parlay API from the Parlay Group. Such an API allows a third-party service to control operation of bearer signal switch 104, including the routing of calls from a telephone that is under a court order to be wiretapped. That is, this API directs bearer signal switch 104 to examine the header of the VoIP packet to determine what IP address sent the VoIP packet, and to determine from a lookup table which telephone number is associated with this IP address. If the telephone number matches one of the telephone numbers whose calls are to be wiretapped, then the API directs the bearer signal switch 104 to redirect the VoIP packet to the POTS switch 108 to be wiretapped.

If the analog signal is being sent to a POTS analog telephone 110, then the analog signal (with analog voice information) is sent directly to analog unit (e.g., telephone) 110. If POTS switch 108 determines that the call is being sent to another VoIP unit 114 (telephone, PDA, etc.), then the analog signal must first be converted back into a VoIP packet by an Analog-to-Digital Converter (ADC) 112.

Figure 1B:
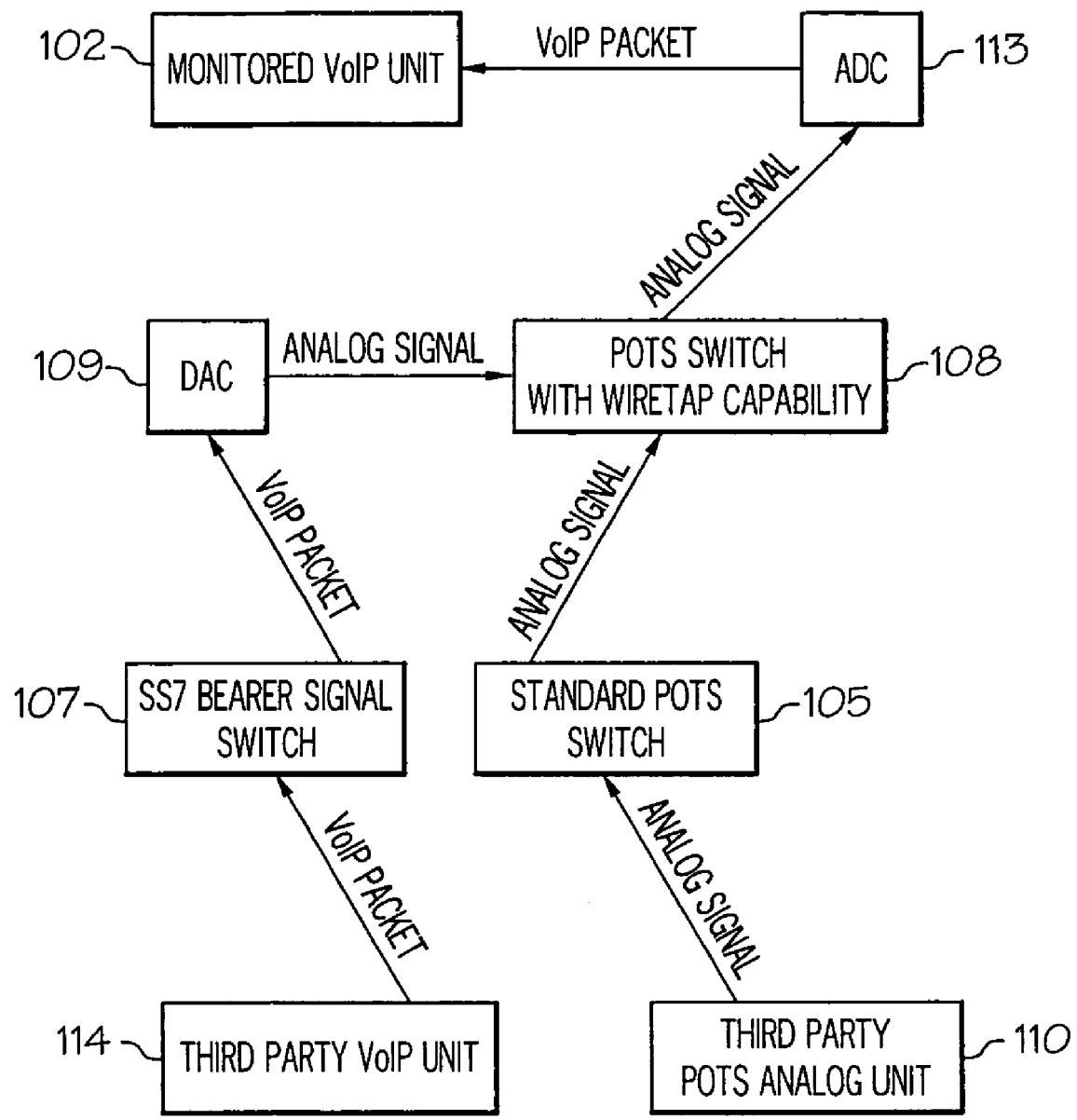
FIG. 1b illustrates a routing flow of incoming telephone calls to the VoIP telephone being wiretapped.

Referring now to FIG. 1*b*, a routing flow of calls incoming to VoIP unit 102 is depicted. If the call originates from analog unit 110, then the incoming call signal is routed to a standard POTS switch 105, which is under the (at least partial) control of software such as the Parlay API described above, such that the incoming call is redirected to the POTS switch 108 that has the wiretapping capability. After being monitored/recorded at POTS switch 108, the call continues as an analog signal to an ADC 112 (which may be the same or different from ADC 112 shown in FIG. 1*a*), where it is converted into a VoIP packet for receipt by the receiving VoIP unit 102.

If the incoming call is from VoIP unit 114, then the VoIP packet is sent to a bearer signal switch 107 (which is preferably SS7 compliant, and may be the same or different from bearer signal switch 104 described in FIG. 1*a*). Bearer signal switch 107 is under (at least partial) control of an API as described above for bearer signal switch 104, such that the VoIP packet is redirected to the POTS switch 108 that can wiretap the call (after being converted into an analog signal at a DAC 109, which may be the same or different from DAC 106 described in FIG. 1*a*). The analog signal is then sent to an ADC 113 (which may be the same or different from ADC 112 describe in FIG. 1*a*), and VoIP unit 102 receives the VoIP packet. Note that the described "incoming call" may either be a newly initiated call from a third party unit (telephone), or may simply be a reply signal (under a full duplex system) from a call that was initiated by VoIP unit 102.

Figure 2:
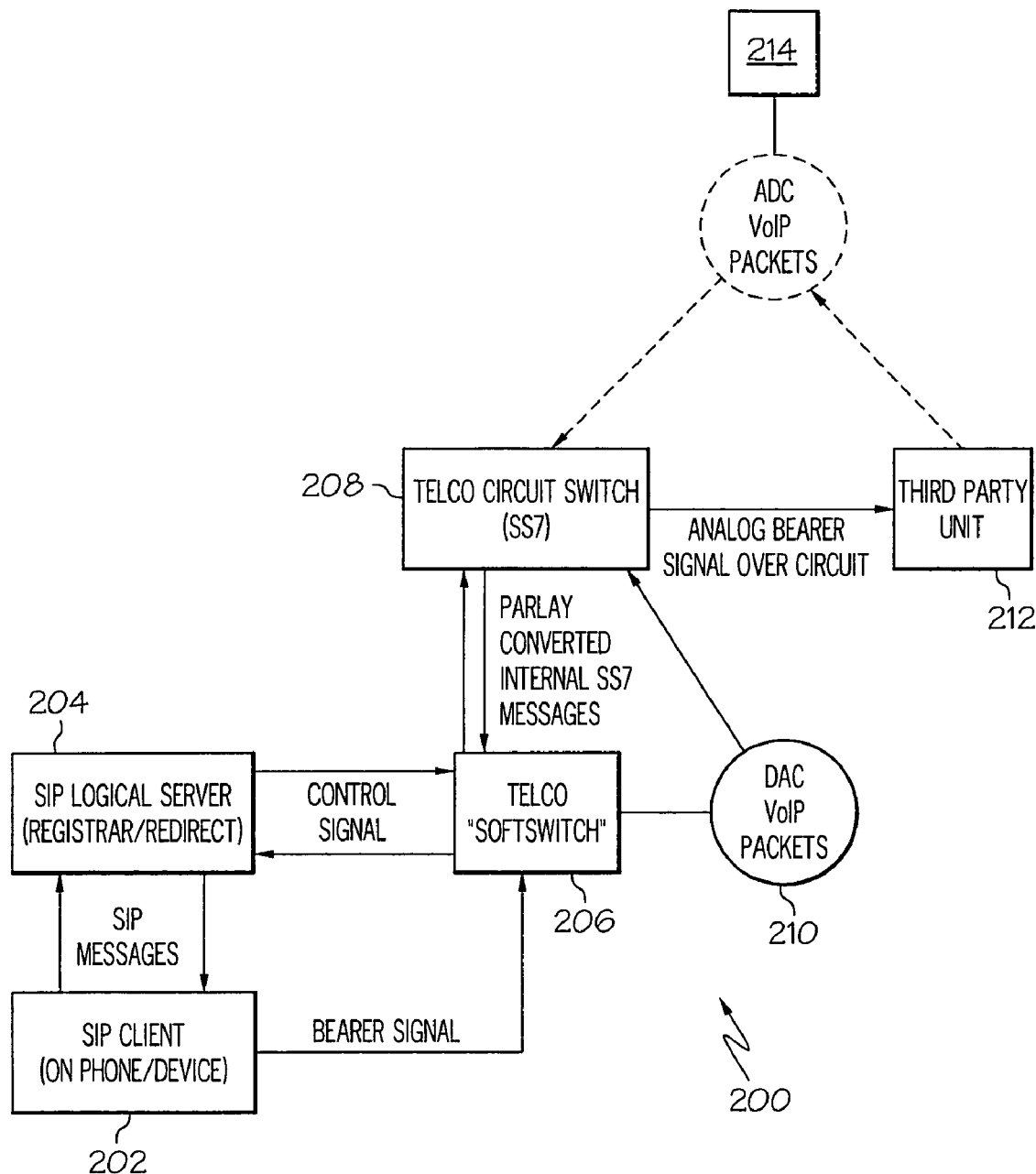
FIG. 2 depicts another routing flow of telephone calls from the VoIP telephone that is the subject of the court-ordered wiretap.

With reference now to FIG. 2, another flow diagram 200 as used in the present intention is presented. Assume that Session Initiation Protocol (SIP) client 202 is a VoIP telephone or similar type unit that is the subject of a court-ordered wiretap. Being a SIP device, SIP client 202 uses the basic format of RFC 2822, as published by the Network Working Group in April 2001, and which is herein incorporated by reference in its entirety. SIP messages travel as requests from SIP client 202 to SIP logical server 204, or as responses from SIP logical server 204 to SIP client 202. Both request and response messages include a control signal (information that includes a method name, address and protocol version, one or more header fields that describe how a message packet is to be routed) and a bearer signal (message body).

When an outgoing call is made from SIP client 202, the control signal for the call is sent from SIP logical server 204 to a Telco "softswitch" 206. Telco softswitch 206 causes VoIP packets (bearer signal) from SIP client 202 to be converted into analog form (DAC VoIP packets 210), which are sent to an SS7 Telco Circuit Switch 208, which includes analog wiretapping equipment. While tapping the call, SS7 Telco Circuit Switch 208 forwards the analog bearer signal to the third party unit 212, which may be an analog, digital, or VoIP telephone as described above in FIGS. 1*a*-*b*. Return (or initial) calls from third party unit 212 are converted back into digital VoIP format (if necessary) as indicated by ADC VoIP packets 214.

Figure 3:
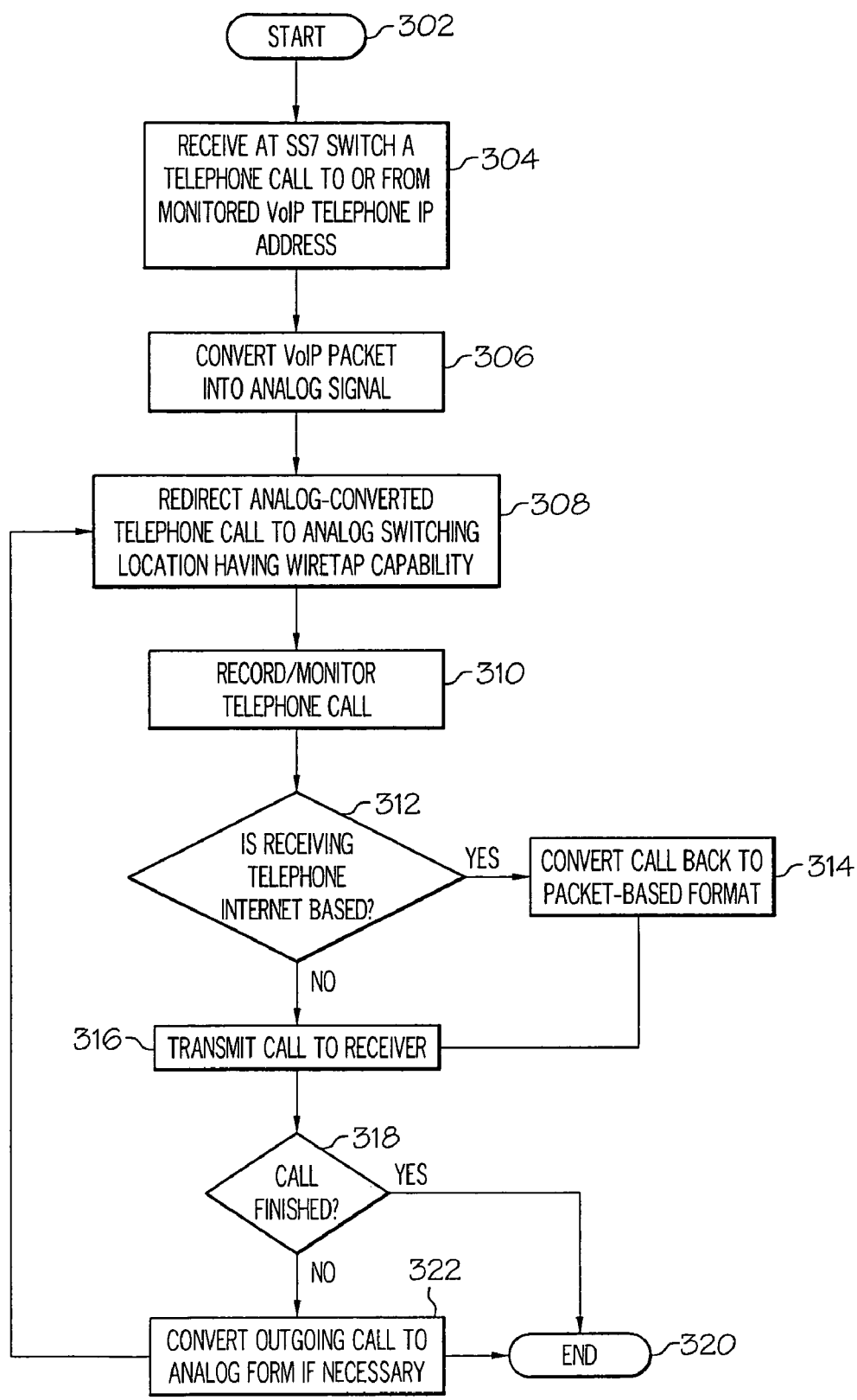
FIG. 3 illustrates a flowchart of exemplary steps taken to route wiretapped calls to a Plain Old Telephone Service (POTS) switch/router having a wiretapping capability.

Referring now to FIG. 3, a flowchart of the steps described in FIGS. 1-2 is presented. After initiator block 302, a SS7 switch receives a telephone call from or to a VoIP address that corresponds with a telephone number that is under a court-order to have calls wiretapped (block 304). If in VoIP format (either incoming or outgoing), the call is converted into analog form (block 306), in order to be easily monitored and recorded. This analog-converted call is redirected to an analog switching location that has wiretapping (monitoring and recording) ability (block 308), where such activities occur (block 310).

After being monitored/recorded, if the call is being sent to a VoIP unit (query block 312), it must be re-converted back into the VoIP format (block 314) before being transmitted to the receiver (block 316). If the call if finished (query block 318), the process ends at terminator block 320. Otherwise, any call (to or from the phone that is under court-ordered surveillance) if converted to analog form (block 322) if necessary, and the process continues at block 308 in an iterative fashion.

Figure 4:
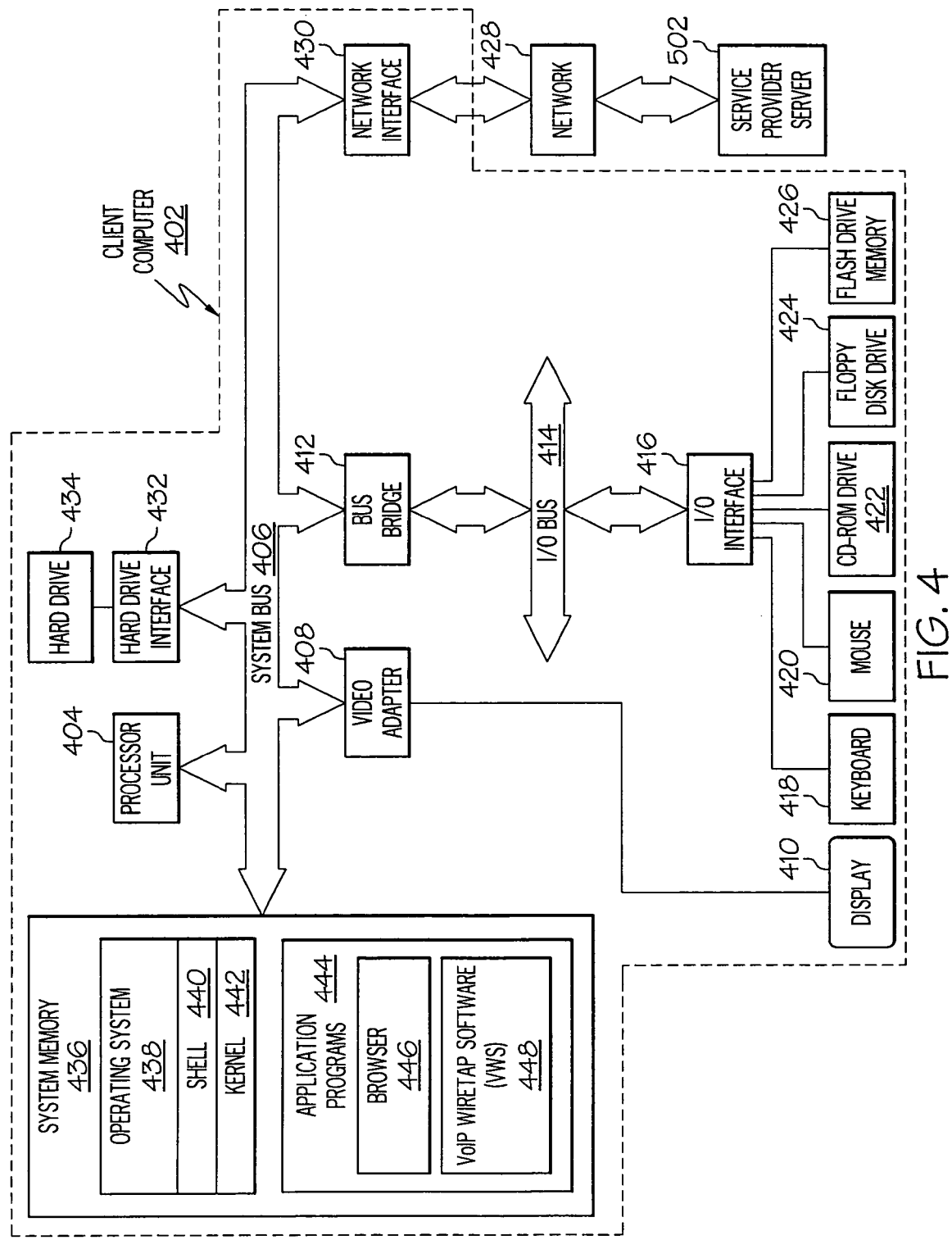
FIG. 4 depicts an exemplary computer in which the present invention may be implemented.

With reference now to FIG. 4, there is depicted a block diagram of an exemplary client computer 402, which may be utilized as Telco softswitch 206 described above. Client computer 402 includes a processor unit 404 that is coupled to a system bus 406. A video adapter 408, which drives/supports a display 410, is also coupled to system bus 406. System bus 406 is coupled via a bus bridge 412 to an Input/Output (I/O) bus 414. An I/O interface 416 is coupled to I/O bus 414. I/O interface 416 affords communication with various I/O devices, including a keyboard 418, a mouse 420, a Compact Disk-Read Only Memory (CD-ROM) drive 422, a floppy disk drive 424, and a flash drive memory 426. The format of the ports connected to I/O interface 416 may be any known to those skilled in the art of computer architecture, including but not limited to Universal Serial Bus (USB) ports.

Client computer 402 is able to communicate with a service provider server 502 via a network 428 using a network interface 430, which is coupled to system bus 406. Network 428 may be an external network such as the Internet, or an internal network such as an Ethernet or a Virtual Private Network (VPN). Using network 428, client computer 402 is able to use the present invention to access service provider server 502.

A hard drive interface 432 is also coupled to system bus 406. Hard drive interface 432 interfaces with a hard drive 434. In a preferred embodiment, hard drive 434 populates a system memory 436, which is also coupled to system bus 406. Data that populates system memory 436 includes client computer 402's operating system (OS) 438 and application programs 444.

OS 438 includes a shell 440, for providing transparent user access to resources such as application programs 444. Generally, shell 440 is a program that provides an interpreter and an interface between the user and the operating system. More specifically, shell 440 executes commands that are entered into a command line user interface or from a file. Thus, shell 440 (as it is called in UNIX®), also called a command processor in Windows®, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 442) for processing. Note that while shell 440 is a text-based, line-oriented user interface, the present invention will equally well support other user interface modes, such as graphical, voice, gestural, etc.

As depicted, OS 438 also includes kernel 442, which includes lower levels of functionality for OS 438, including providing essential services required by other parts of OS 438 and application programs 444, including memory management, process and task management, disk management, and mouse and keyboard management.

Application programs 444 include a browser 446. Browser 446 includes program modules and instructions enabling a World Wide Web (WWW) client (i.e., client computer 402) to send and receive network messages to the Internet using HyperText Transfer Protocol (HTTP) messaging, thus enabling communication with service provider server 502.

Application programs 444 in client computer 402's system memory also include a VoIP Wiretap Software (VWS) 448.

VWS 448 includes code for implementing the processes described in FIGS. 1-3. In one embodiment, client computer 402 is able to download VWS 448 from service provider server 502.

The hardware elements depicted in client computer 402 are not intended to be exhaustive, but rather are representative to highlight essential components required by the present invention. For instance, client computer 402 may include alternate memory storage devices such as magnetic cassettes, Digital Versatile Disks (DVDs), Bernoulli cartridges, and the like. These and other variations are intended to be within the spirit and scope of the present invention.

Figure 5:
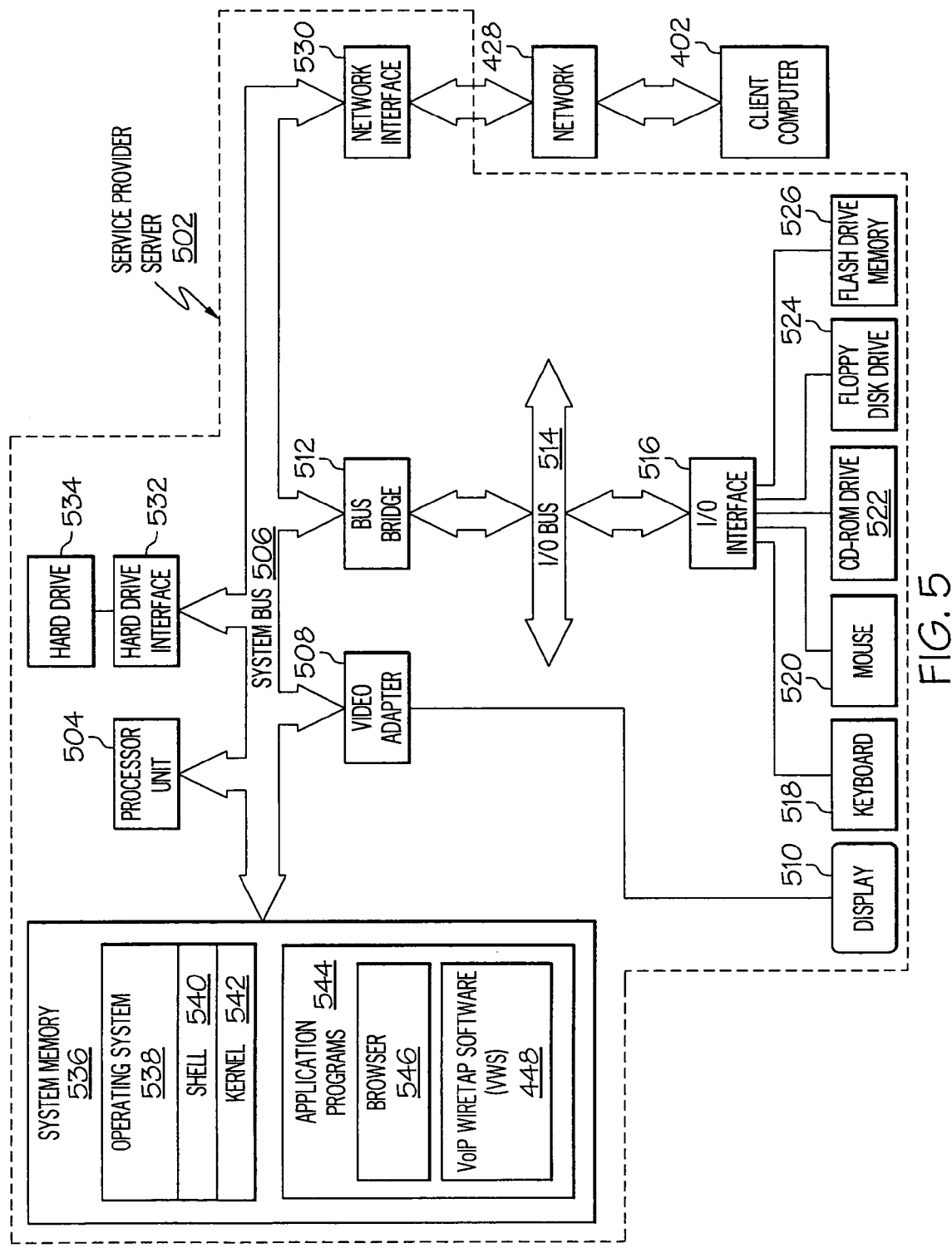
FIG. 5 illustrates an exemplary server from which software for executing the present invention may be deployed.

As noted above, VWS 448 can be downloaded to client computer 402 from service provider server 502, shown in exemplary form in FIG. 5. Service provider server 502 includes a processor unit 504 that is coupled to a system bus 506. A video adapter 508 is also coupled to system bus 506. Video adapter 508 drives/supports a display 510. System bus 506 is coupled via a bus bridge 512 to an Input/Output (I/O) bus 514. An I/O interface 516 is coupled to I/O bus 514. I/O interface 516 affords communication with various I/O devices, including a keyboard 518, a mouse 520, a Compact Disk-Read Only Memory (CD-ROM) drive 522, a floppy disk drive 524, and a flash drive memory 526. The format of the ports connected to I/O interface 516 may be any known to those skilled in the art of computer architecture, including but not limited to Universal Serial Bus (USB) ports.

Service provider server 502 is able to communicate with client computer 402 via network 428 using a network interface 530, which is coupled to system bus 506. Access to network 428 allows service provider server 502 to execute and/or download VWS 448 to client computer 402.

System bus 506 is also coupled to a hard drive interface 532, which interfaces with a hard drive 534. In a preferred embodiment, hard drive 534 populates a system memory 536, which is also coupled to system bus 506. Data that populates system memory 536 includes service provider server 502's operating system 538, which includes a shell 540 and a kernel 542. Shell 540 is incorporated in a higher level operating system layer and utilized for providing transparent user access to resources such as application programs 544, which include a browser 546, and a copy of VWS 448 described above, which can be deployed to client computer 402.

The hardware elements depicted in service provider server 502 are not intended to be exhaustive, but rather are representative to highlight essential components required by the present invention. For instance, service provider server 502 may include alternate memory storage devices such as flash drives, magnetic cassettes, Digital Versatile Disks (DVDs), Bernoulli cartridges, and the like. These and other variations are intended to be within the spirit and scope of the present invention.

Note further that, in a preferred embodiment of the present invention, service provider server 502 performs all of the functions associated with the present invention (including execution of VWS 448), thus freeing client computer 402 from using its resources.

It should be understood that at least some aspects of the present invention may alternatively be implemented in a computer-useable medium that contains a program product. Programs defining functions on the present invention can be delivered to a data storage system or a computer system via a variety of signal-bearing media, which include, without limitation, non-writable storage media (e.g., CD-ROM), writable storage media (e.g., hard disk drive, read/write CD ROM, optical media), system memory such as but not limited to Random Access Memory (RAM), and communication media, such as computer and telephone networks including Ethernet, the Internet, wireless networks, and like network systems. It should be understood, therefore, that such signal-bearing media when carrying or encoding computer readable instructions that direct method functions in the present invention, represent alternative embodiments of the present invention. Further, it is understood that the present invention may be implemented by a system having means in the form of hardware, software, or a combination of software and hardware as described herein or their equivalent.

Software Deployment

Thus, the method described herein, and in particular as shown and described in FIGS. 1-3, can be deployed as a process software from service provider server 502 (shown in FIG. 5) to client computer 402 (shown in FIG. 4).

Figure 6A:
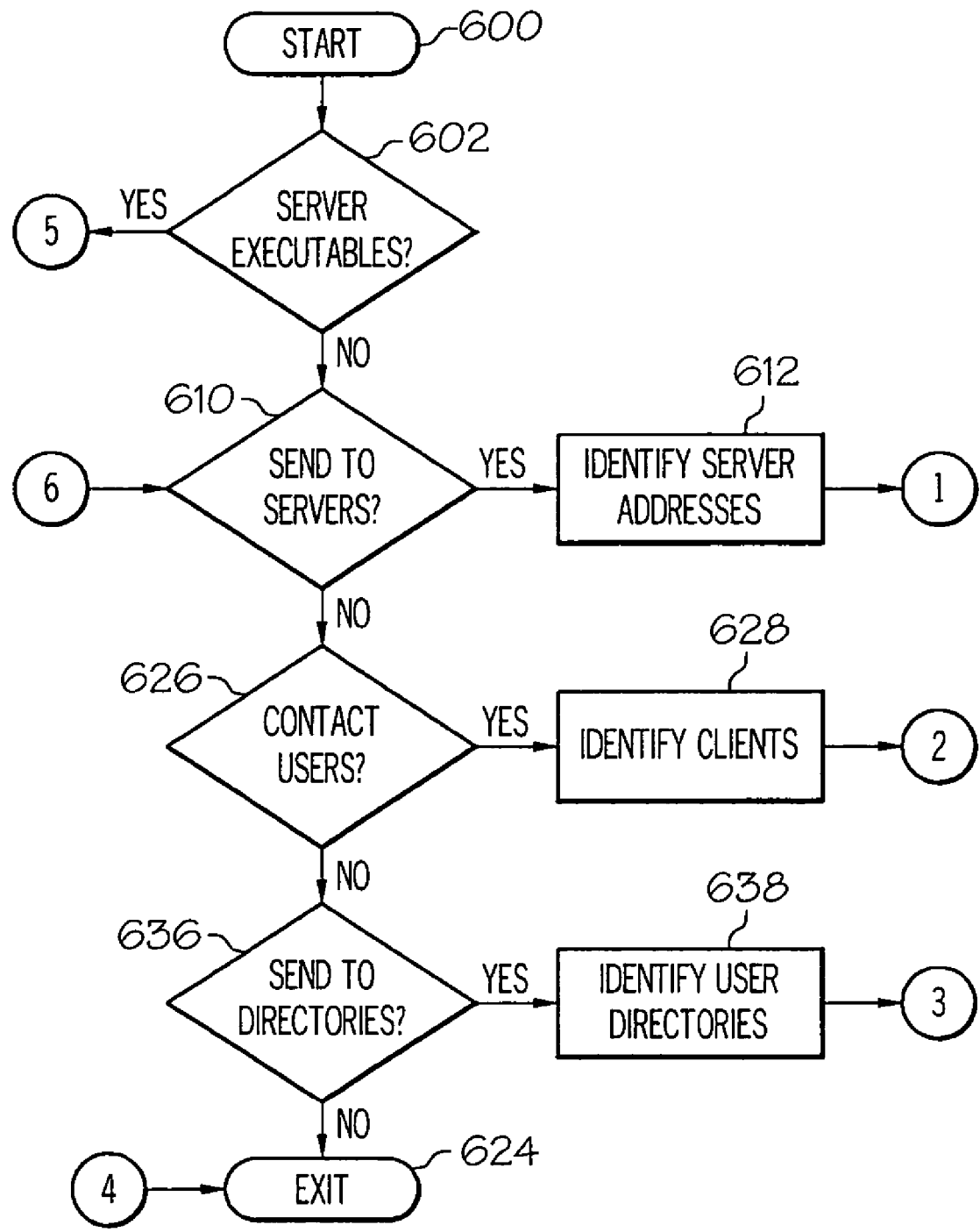
FIGS. 6a-b show a flowchart of steps taken to deploy software capable of executing the steps shown and described in FIGS. 1-3.
Figure 6B:
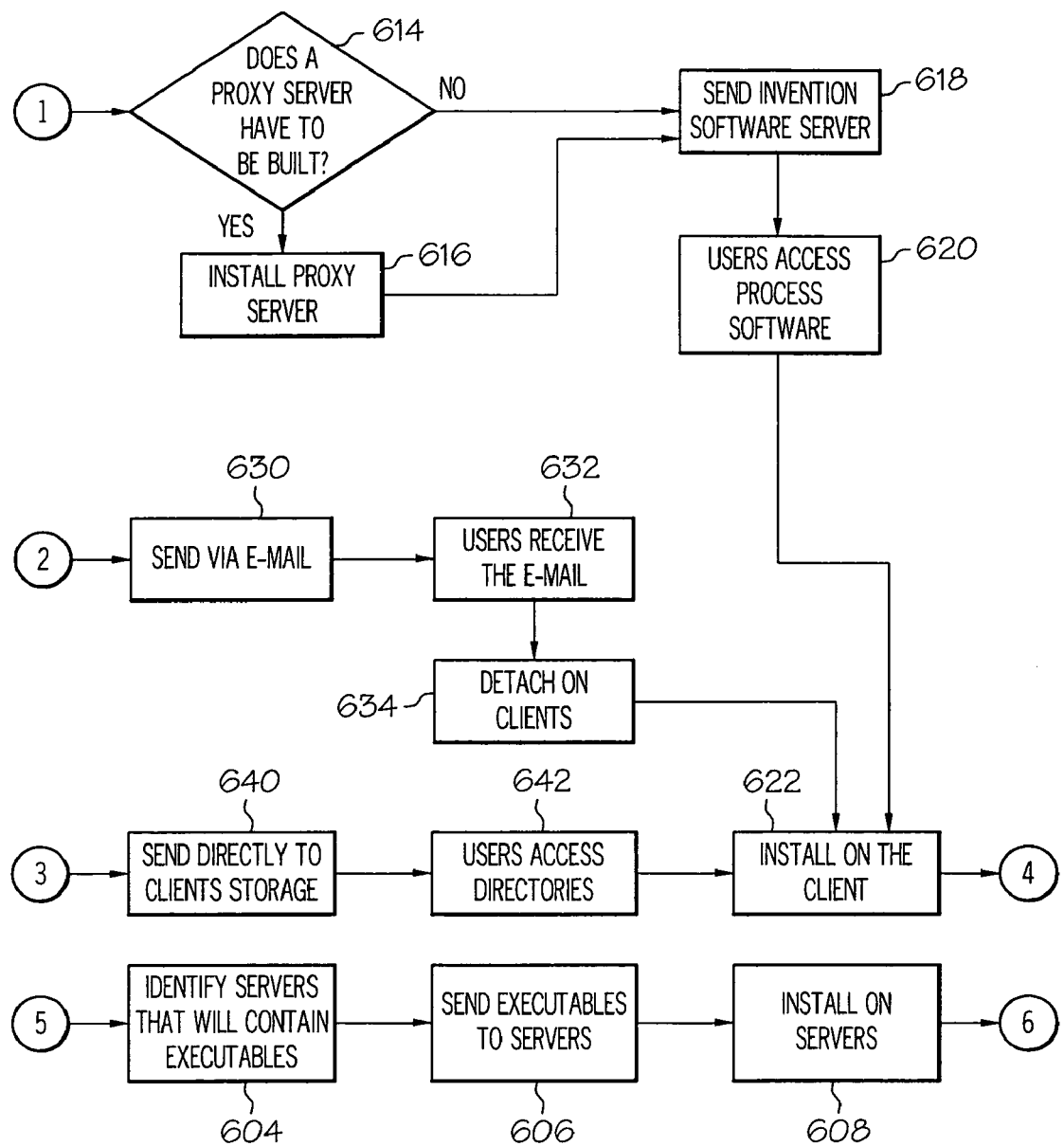

Referring then to FIG. 6, step 600 begins the deployment of the process software. The first thing is to determine if there are any programs that will reside on a server or servers when the process software is executed (query block 602). If this is the case, then the servers that will contain the executables are identified (block 604). The process software for the server or servers is transferred directly to the servers' storage via File Transfer Protocol (FTP) or some other protocol or by copying though the use of a shared file system (block 606). The process software is then installed on the servers (block 608).

Next, a determination is made on whether the process software is to be deployed by having users access the process software on a server or servers (query block 610). If the users are to access the process software on servers, then the server addresses that will store the process software are identified (block 612).

A determination is made if a proxy server is to be built (query block 614) to store the process software. A proxy server is a server that sits between a client application, such as a Web browser, and a real server. It intercepts all requests to the real server to see if it can fulfill the requests itself. If not, it forwards the request to the real server. The two primary benefits of a proxy server are to improve performance and to filter requests. If a proxy server is required, then the proxy server is installed (block 616). The process software is sent to the servers either via a protocol such as FTP or it is copied directly from the source files to the server files via file sharing (block 618). Another embodiment would be to send a transaction to the servers that contained the process software and have the server process the transaction, then receive and copy the process software to the server's file system. Once the process software is stored at the servers, the users, via their client computers, then access the process software on the servers and copy to their client computers file systems (block 620). Another embodiment is to have the servers automatically copy the process software to each client and then run the installation program for the process software at each client computer. The user executes the program that installs the process software on his client computer (block 622) then exits the process (terminator block 624).

In query step 626, a determination is made whether the process software is to be deployed by sending the process software to users via e-mail. The set of users where the process software will be deployed are identified together with the addresses of the user client computers (block 628). The process software is sent via e-mail to each of the users' client computers (block 630). The users then receive the e-mail (block 632) and then detach the process software from the e-mail to a directory on their client computers (block 634). The user executes the program that installs the process software on his client computer (block 622) then exits the process (terminator block 624).

Lastly a determination is made on whether to the process software will be sent directly to user directories on their client computers (query block 636). If so, the user directories are identified (block 638). The process software is transferred directly to the user's client computer directory (block 640). This can be done in several ways such as, but not limited to, sharing of the file system directories and then copying from the sender's file system to the recipient user's file system or alternatively using a transfer protocol such as File Transfer Protocol (FTP). The users access the directories on their client file systems in preparation for installing the process software (block 642). The user executes the program that installs the process software on his client computer (block 622) and then exits the process (terminator block 624).

VPN Deployment

The present software can be deployed to third parties as part of a service wherein a third party VPN service is offered as a secure deployment vehicle or wherein a VPN is built on-demand as required for a specific deployment.

A virtual private network (VPN) is any combination of technologies that can be used to secure a connection through an otherwise unsecured or untrusted network. VPNs improve security and reduce operational costs. The VPN makes use of a public network, usually the Internet, to connect remote sites or users together. Instead of using a dedicated, real-world connection such as leased line, the VPN uses "virtual" connections routed through the Internet from the company's private network to the remote site or employee. Access to the software via a VPN can be provided as a service by specifically constructing the VPN for purposes of delivery or execution of the process software (i.e. the software resides elsewhere) wherein the lifetime of the VPN is limited to a given period of time or a given number of deployments based on an amount paid.

The process software may be deployed, accessed and executed through either a remote-access or a site-to-site VPN.

When using the remote-access VPNs the process software is deployed, accessed and executed via the secure, encrypted connections between a company's private network and remote users through a third-party service provider. The enterprise service provider (ESP) sets a network access server (NAS) and provides the remote users with desktop client software for their computers. The telecommuters can then dial a toll-bee number or attach directly via a cable or DSL modem to reach the NAS and use their VPN client software to access the corporate network and to access, download and execute the process software.

When using the site-to-site VPN, the process software is deployed, accessed and executed through the use of dedicated equipment and large-scale encryption that are used to connect a company's multiple fixed sites over a public network such as the Internet.

The process software is transported over the VPN via tunneling which is the process of placing an entire packet within another packet and sending it over a network. The protocol of the outer packet is understood by the network and both points, called tunnel interfaces, where the packet enters and exits the network.

Figure 7A:
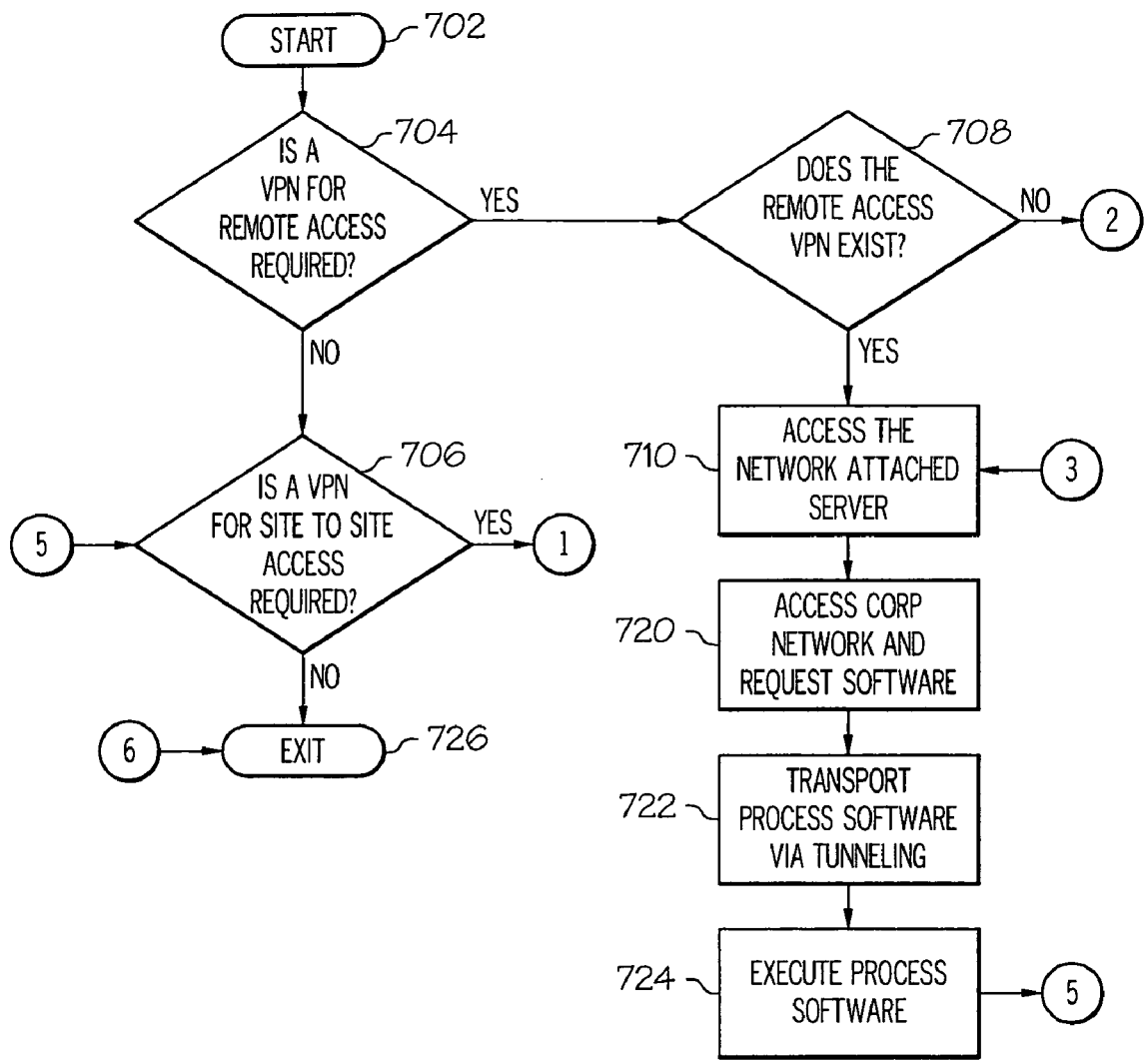
FIGS. 7a-c show a flowchart of steps taken to deploy in a Virtual Private Network (VPN) software that is capable of executing the steps shown and described in FIGS. 1-3.
Figure 7B:
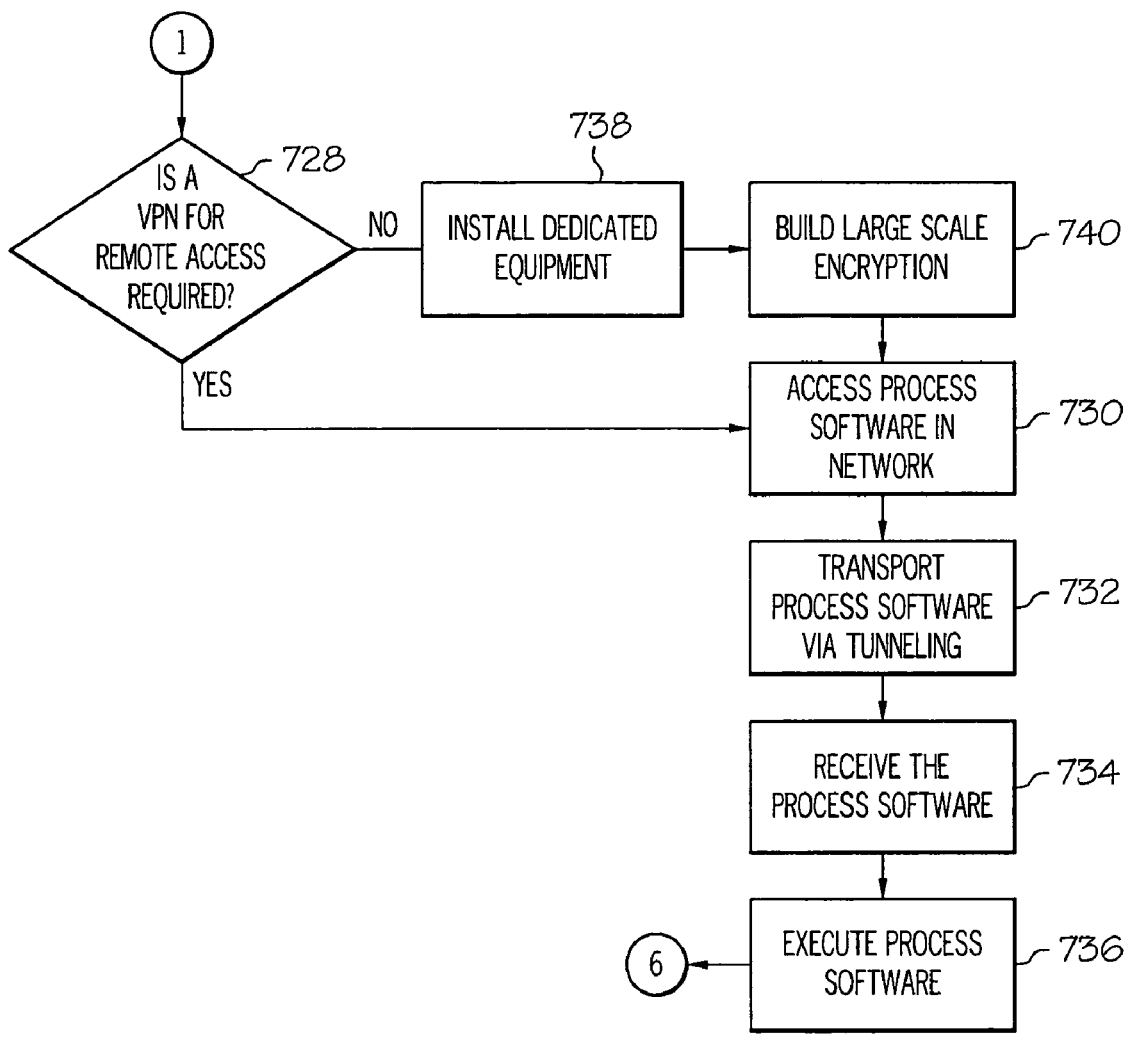
Figure 7C:
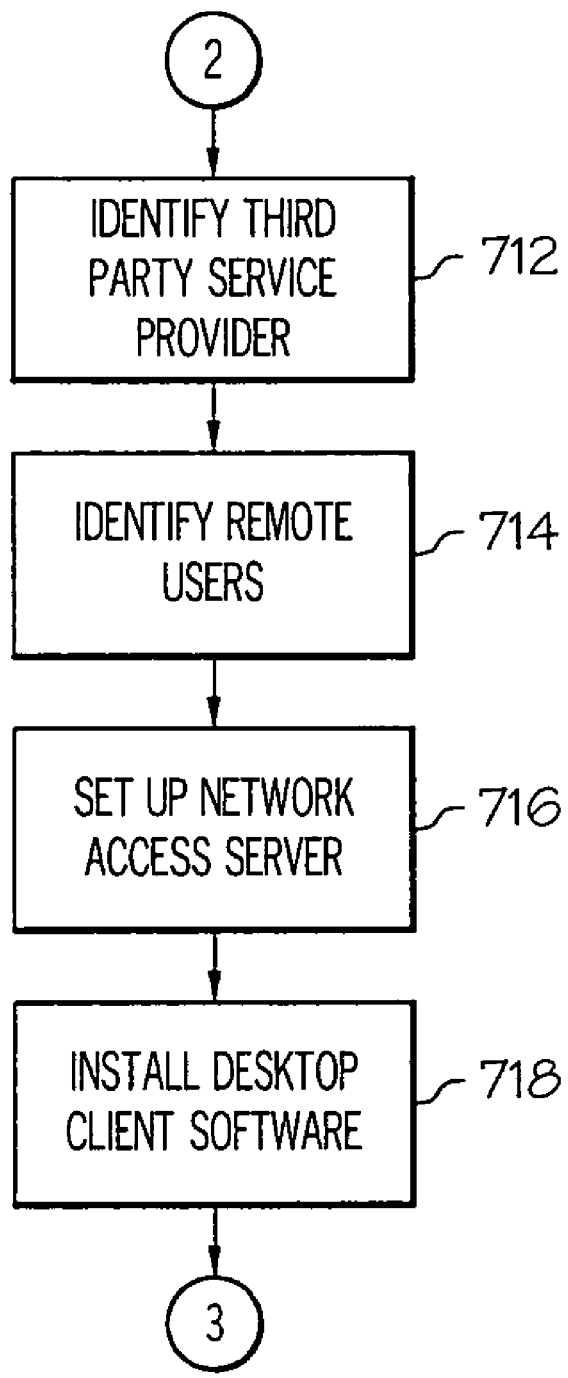

The process for such VPN deployment is described in FIG. 7. Initiator block 702 begins the Virtual Private Network (VPN) process. A determination is made to see if a VPN for remote access is required (query block 704). If it is not required, then proceed to query block 706. If it is required, then determine if the remote access VPN exists (query block 708).

If a VPN does exist, then proceed to block 710. Otherwise identify a third party provider that will provide the secure, encrypted connections between the company's private network and the company's remote users (block 712). The company's remote users are identified (block 714). The third party provider then sets up a network access server (NAS) (block 716) that allows the remote users to dial a toll free number or attach directly via a broadband modem to access, download and install the desktop client software for the remote-access VPN (block 718).

After the remote access VPN has been built or if it has been previously installed, the remote users can access the process software by dialing into the NAS or attaching directly via a cable or DSL modem into the NAS (block 710). This allows entry into the corporate network where the process software is accessed (block 720). The process software is transported to the remote user's desktop over the network via tunneling. That is, the process software is divided into packets and each packet including the data and protocol is placed within another packet (block 722). When the process software arrives at the remote user's desktop, it is removed from the packets, reconstituted and then is executed on the remote user's desktop (block 724).

A determination is then made to see if a VPN for site to site access is required (query block 706). If it is not required, then proceed to exit the process (terminator block 726). Otherwise, determine if the site to site VPN exists (query block 728). If it does exist, then proceed to block 730. Otherwise, install the dedicated equipment required to establish a site to site VPN (block 738). Then build the large scale encryption into the VPN (block 740).

After the site to site VPN has been built or if it had been previously established, the users access the process software via the VPN (block 730). The process software is transported to the site users over the network via tunneling (block 732). That is the process software is divided into packets and each packet including the data and protocol is placed within another packet (block 734). When the process software arrives at the remote user's desktop, it is removed from the packets, reconstituted and is executed on the site user's desktop (block 736). The process then ends at terminator block 726.

Software Integration

The process software which consists of code for implementing the process described herein may be integrated into a client, server and network environment by providing for the process software to coexist with applications, operating systems and network operating systems software and then installing the process software on the clients and servers in the environment where the process software will function.

The first step is to identify any software on the clients and servers including the network operating system where the process software will be deployed that are required by the process software or that work in conjunction with the process software. This includes the network operating system that is software that enhances a basic operating system by adding networking features.

Next, the software applications and version numbers will be identified and compared to the list of software applications and version numbers that have been tested to work with the process software. Those software applications that are missing or that do not match the correct version will be upgraded with the correct version numbers. Program instructions that pass parameters from the process software to the software applications will be checked to ensure the parameter lists matches the parameter lists required by the process software. Conversely parameters passed by the software applications to the process software will be checked to ensure the parameters match the parameters required by the process software. The client and server operating systems including the network operating systems will be identified and compared to the list of operating systems, version numbers and network software that have been tested to work with the process software. Those operating systems, version numbers and network software that do not match the list of tested operating systems and version numbers will be upgraded on the clients and servers to the required level.

After ensuring that the software, where the process software is to be deployed, is at the correct version level that has been tested to work with the process software, the integration is completed by installing the process software on the clients and servers.

Figure 8A:
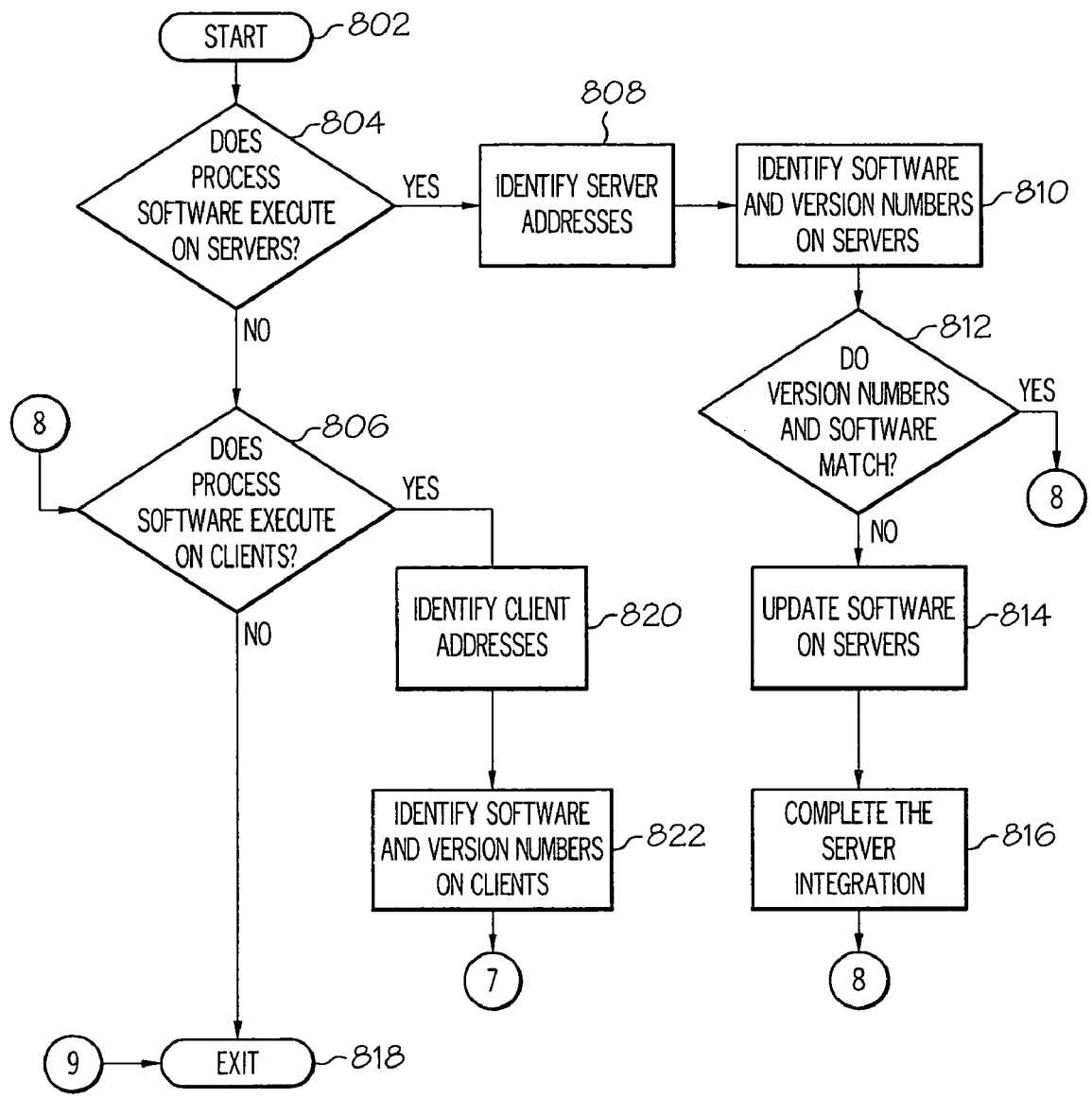
FIGS. 8a-b show a flowchart showing steps taken to integrate into an computer system software that is capable of executing the steps shown and described in FIGS. 1-3.
Figure 8B:
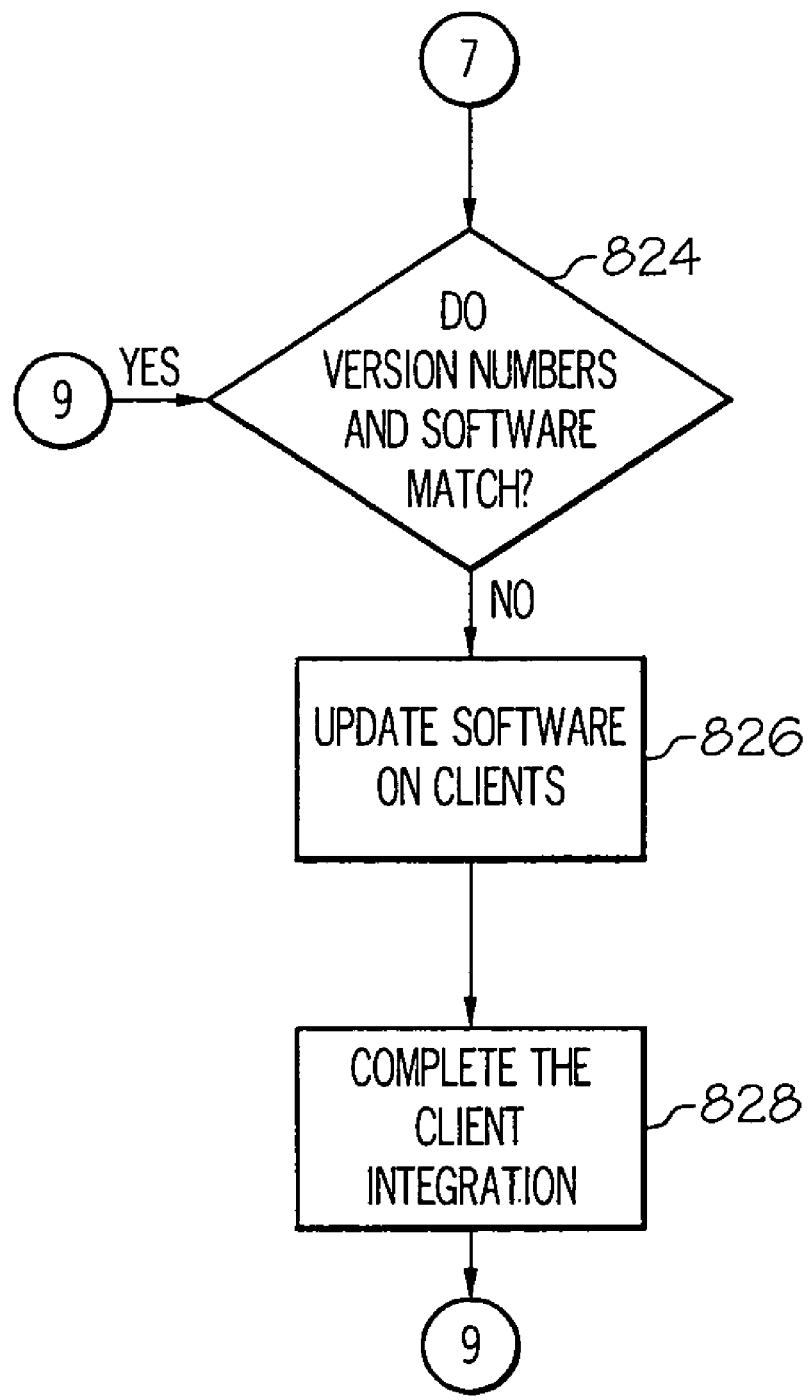

For a high-level description of this process, reference is now made to FIG. 8. Initiator block 802 begins the integration of the process software. The first tiling is to determine if there are any process software programs that will execute on a server or servers (block 804). If this is not the case, then integration proceeds to query block 806. If this is the case, then the server addresses are identified (block 808). The servers are checked to see if they contain software that includes the operating system (OS), applications, and network operating systems (NOS), together with their version numbers, which have been tested with the process software (block 810). The servers are also checked to determine if there is any missing software that is required by the process software in block 810.

A determination is made if the version numbers match the version numbers of OS, applications and NOS that have been tested with the process software (block 812). If all of the versions match and there is no missing required software the integration continues in query block 806.

If one or more of the version numbers do not match, then the unmatched versions are updated on the server or servers with the correct versions (block 814). Additionally, if there is missing required software, then it is updated on the server or servers in the step shown in block 814. The server integration is completed by installing the process software (block 816).

The step shown in query block 806, which follows either the steps shown in block 804, 812 or 816 determines if there are any programs of the process software that will execute on the clients. If no process software programs execute on the clients the integration proceeds to terminator block 818 and exits. If this not the case, then the client addresses are identified as shown in block 820.

The clients are checked to see if they contain software that includes the operating system (OS), applications, and network operating systems (NOS), together with their version numbers, which have been tested with the process software (block 822). The clients are also checked to determine if there is any missing software that is required by the process software in the step described by block 822.

A determination is made is the version numbers match the version numbers of OS, applications and NOS that have been tested with the process software (query block 824). If all of the versions match and there is no missing required software, then the integration proceeds to terminator block 818 and exits.

If one or more of the version numbers do not match, then the unmatched versions are updated on the clients with the correct versions (block 826). In addition, if there is missing required software then it is updated on the clients (also block 826). The client integration is completed by installing the process software on the clients (block 828). The integration proceeds to terminator block 818 and exits.

On Demand

The process software is shared, simultaneously serving multiple customers in a flexible, automated fashion. It is standardized, requiring little customization and it is scalable, providing capacity on demand in a pay-as-you-go model.

The process software can be stored on a shared file system accessible from one or more servers. The process software is executed via transactions that contain data and server processing requests that use CPU units on the accessed server. CPU units are units of time such as minutes, seconds, hours on the central processor of the server. Additionally the assessed server may make requests of other servers that require CPU units. CPU units are an example that represents but one measurement of use. Other measurements of use include but are not limited to network bandwidth, memory usage, storage usage, packet transfers, complete transactions etc.

When multiple customers use the same process software application, their transactions are differentiated by the parameters included in the transactions that identify the unique customer and the type of service for that customer. All of the CPU units and other measurements of use that are used for the services for each customer are recorded. When the number of transactions to any one server reaches a number that begins to affect the performance of that server, other servers are accessed to increase the capacity and to share the workload. Likewise when other measurements of use such as network bandwidth, memory usage, storage usage, etc. approach a capacity so as to affect performance, additional network bandwidth, memory usage, storage etc. are added to share the workload.

The measurements of use used for each service and customer are sent to a collecting server that sums the measurements of use for each customer for each service that was processed anywhere in the network of servers that provide the shared execution of the process software. The summed measurements of use units are periodically multiplied by unit costs and the resulting total process software application service costs are alternatively sent to the customer and or indicated on a web site accessed by the customer which then remits payment to the service provider.

In another embodiment, the service provider requests payment directly from a customer account at a banking or financial institution.

In another embodiment, if the service provider is also a customer of the customer that uses the process software application, the payment owed to the service provider is reconciled to the payment owed by the service provider to minimize the transfer of payments.

Figure 9A:
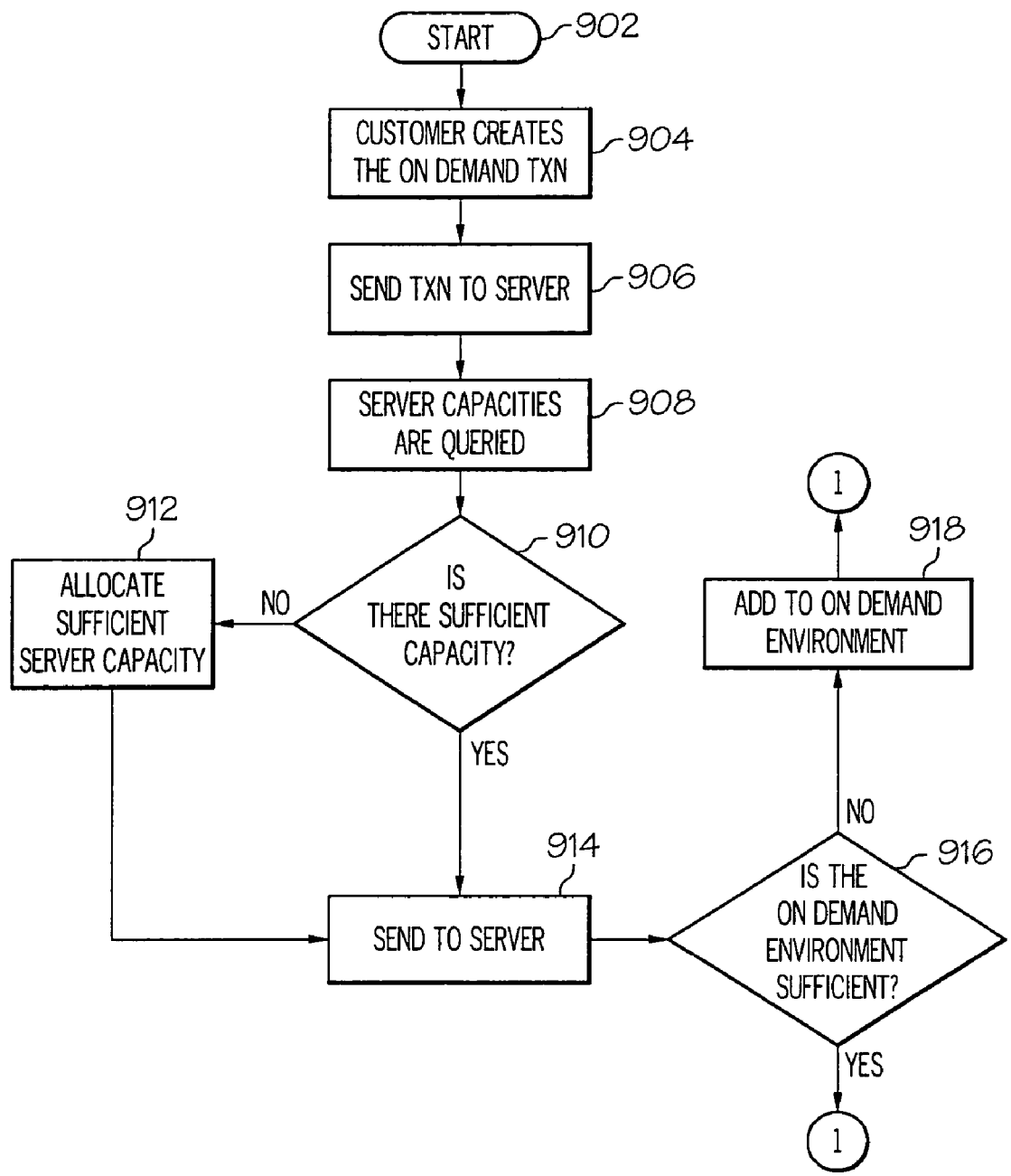
FIGS. 9a-b show a flowchart showing steps taken to execute the steps shown and described in FIGS. 1-3 using an on-demand service provider.
Figure 9B:
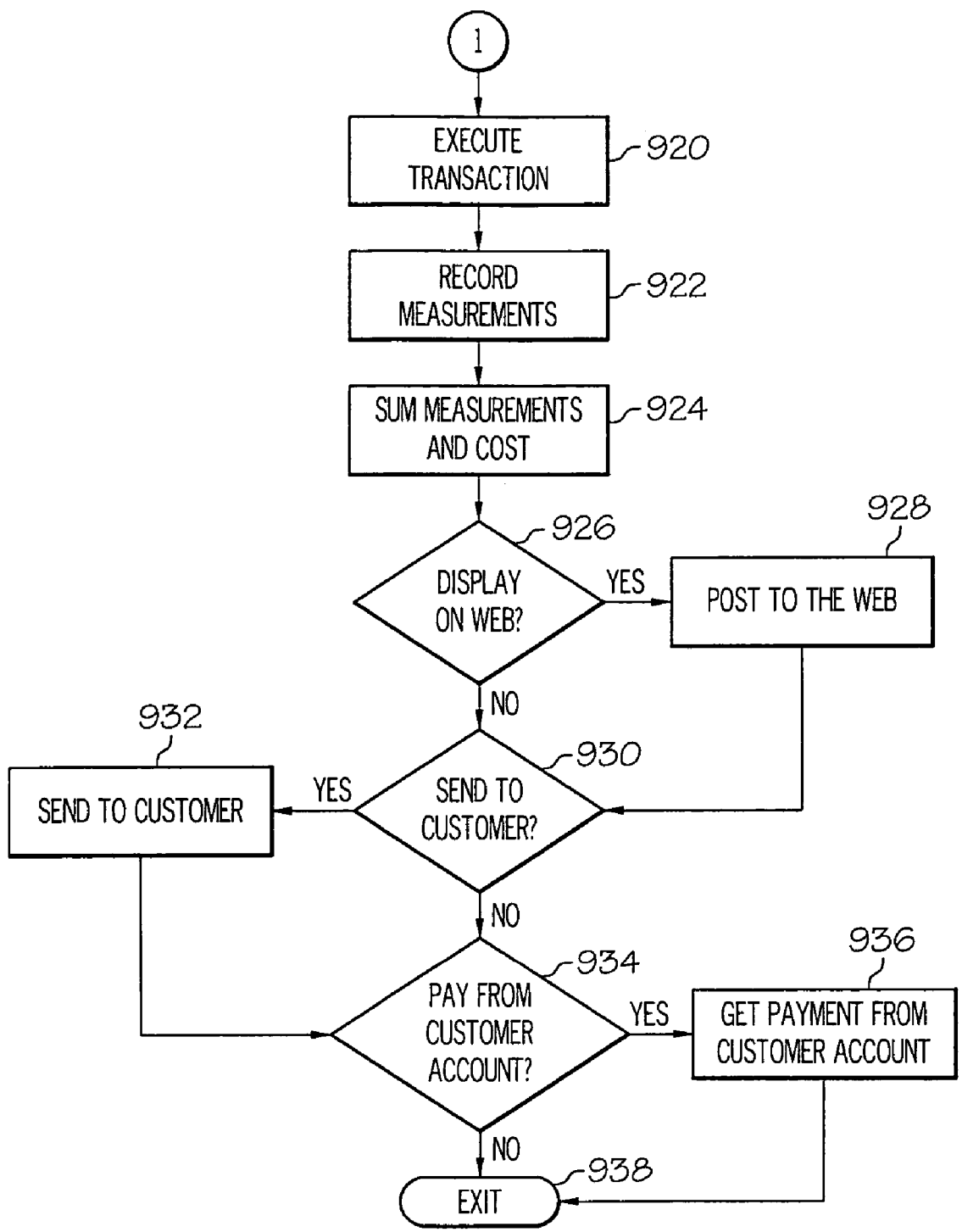

With reference now to FIG. 9, initiator block 902 begins the On Demand process. A transaction is created than contains the unique customer identification, the requested service type and any service parameters that further, specify the type of service (block 904). The transaction is then sent to the main server (block 906). In an On Demand environment the main server can initially be the only server, then as capacity is consumed other servers are added to the On Demand environment.

The server central processing unit (CPU) capacities in the On Demand environment are queried (block 908). The CPU requirement of the transaction is estimated, then the servers available CPU capacity in the On Demand environment are compared to the transaction CPU requirement to see if there is sufficient CPU available capacity in any server to process the transaction (query block 910). If there is not sufficient server CPU available capacity, then additional server CPU capacity is allocated to process the transaction (block 912). If there was already sufficient available CPU capacity then the transaction is sent to a selected server (block 914).

Before executing the transaction, a check is made of the remaining On Demand environment to determine if the environment has sufficient available capacity for processing the transaction. This environment capacity consists of such things as but not limited to network bandwidth, processor memory, storage etc. (block 916). If there is not sufficient available capacity, then capacity will be added to the On Demand environment (block 918). Next the required software to process the transaction is accessed, loaded into memory, then the transaction is executed (block 920).

The usage measurements are recorded (block 922). The usage measurements consist of the portions of those functions in the On Demand environment that are used to process the transaction. The usage of such functions as, but not limited to, network bandwidth, processor memory, storage and CPU cycles are what is recorded. The usage measurements are summed, multiplied by unit costs and then recorded as a charge to the requesting customer (block 924).

If the customer has requested that the On Demand costs be posted to a web site (query block 926), then they are posted (block 928). If the customer has requested that the On Demand costs be sent via e-mail to a customer address (query block 930), then these costs are sent to the customer (block 932). If the customer has requested that the On Demand costs be paid directly from a customer account (query block 934), then payment is received directly from the customer account (block 936). The On Demand process is then exited at terminator block 938.

While the present invention has been particularly shown and described with reference to a preferred embodiment, it will be understood by those skilled in the art that various changes in form and detail may be made therein without departing from the spirit and scope of the invention. Furthermore, as used in the specification and the appended claims, the term "computer" or "system" or "computer system" or "computing device" includes any data processing system including, but not limited to, personal computers, servers, workstations, network computers, main frame computers, routers, switches, Personal Digital Assistants (PDA's), telephones, and any other system capable of processing, transmitting, receiving, capturing and/or storing data. Similarly, while the term "switch" has been used to describe analog switching devices, it is understood that the term "switch" also includes like technologies and hardware, including, but not limited to, routers.

What is claimed is:

1. A method of assisting law enforcement surveillance of a telephone call, the method comprising:

receiving an indication of a call that is placed with a pre-identified telephonic unit that uses an internet packet protocol for transmission, wherein the pre-identified telephonic unit has been selected for telephone call surveillance;

converting the call into a converted call that is in analog form; and redirecting the converted call to an analog switching station that is capable of performing surveillance of the call, wherein telephonic traffic outbound from the pre-identified telephonic unit is via a Signaling System Number 7 (SS7) compliant switch, and wherein the method further comprises:

sending to the SS7 compliant switch an override message that instructs the SS7 compliant switch to redirect the call in analog form to the analog switching station.

2. The method of claim 1, wherein the pre-identified telephonic unit is a subject of a wiretap court order.

3. The method of claim 2, wherein the surveillance of the call comprises recording the call.

4. The method of claim 3, wherein the call is an audio-only call.

5. The method of claim 1, wherein the override message is an Application Program Interface (API) that is transmitted to the SS7 compliant switch from an external application server.

6. A system comprising:

a processor;

a data bus coupled to the processor; and a computer-usable medium embodying computer program code, the computer-usable medium being coupled to the data bus, the computer program code comprising instructions executable by the processor and configured for:

receiving an indication of a call that is placed with a pre-identified telephonic unit that uses an internet packet protocol for transmission, wherein the pre-identified telephonic unit has been selected for telephone call surveillance;

converting the call into a converted call that is in analog form; and redirecting the converted call to an analog switching station that is capable of performing surveillance of the call, wherein telephonic traffic outbound from the pre-identified telephonic unit is via a Signaling System Number 7 (SS7) compliant switch, and wherein the instructions executable by the processor are further configured for:

sending to the SS7 compliant switch an override message that instructs the SS7 compliant switch to redirect the call in analog form to the analog switching station.

7. The system of claim 6, wherein the pre-identified telephonic unit is a subject of a wiretap court order.

8. The system of claim 7, wherein the surveillance of the call comprises recording the call.

9. The system of claim 8, wherein the call is an audio-only call.

10. The system of claim 6, wherein the override message is an Application Program Interface (API) that is transmitted to the SS7 compliant switch from an external application server.

11. A computer-usable medium embodying computer program code, the computer program code comprising computer executable instructions configured for:
   receiving an indication of a call that is placed with a pre-identified telephonic unit that uses an internet packet protocol for transmission, wherein the pre-identified telephonic unit has been selected for telephone call surveillance;
   converting the call into a converted call that is in analog form; and
   redirecting the converted call to an analog switching station that is capable of performing surveillance of the call, wherein telephonic traffic outbound from the pre-identified telephonic unit is via a Signaling System Number 7 (SS7) compliant switch, and wherein the computer executable instructions are further configured for:
   sending to the SS7 compliant switch an override message that instructs the SS7 compliant switch to redirect the call in analog form to the analog switching station.

12. The computer-useable medium of claim 11, wherein the pre-identified telephonic unit is a subject of a wiretap court order.

13. The computer-useable medium of claim 12, wherein the surveillance of the call comprises recording the call.

14. The computer-useable medium of claim 13, wherein the call is an audio-only call.

15. The computer-useable medium of claim 11, wherein the override message is an Application Program Interface (API) that is transmitted to the SS7 compliant switch from an external application server.

16. The computer-useable medium of claim 11, wherein the computer program code is deployed to the SS7 compliant switch from a service provider's server that is located at a remote location.

17. The computer-useable medium of claim 11, wherein the computer program code is provided by a service provider to a customer on an on-demand basis.

* * * * *